United States Patent
Heo et al.

(10) Patent No.: US 9,473,830 B2
(45) Date of Patent: Oct. 18, 2016

(54) SMART METERING SYSTEM USING WHITE SPACE BAND AND SMART METERING METHOD USING THE SAME

(71) Applicant: KT CORPORATION, Seongnam, Gyeonggi-Do (KR)

(72) Inventors: Si-Young Heo, Seoul (KR); Dae-Hyun Cha, Daegu (KR); Hyun-Pyo Kim, Seoul (KR); Jong-Sik Lee, Seoul (KR)

(73) Assignee: KT Corporation, Seongnam (KR)

( * ) Notice: Subject to any disclaimer, the term of this patent is extended or adjusted under 35 U.S.C. 154(b) by 686 days.

(21) Appl. No.: 13/666,378

(22) Filed: Nov. 1, 2012

(65) Prior Publication Data

US 2013/0106617 A1 May 2, 2013

(30) Foreign Application Priority Data

Nov. 1, 2011 (KR) .......................... 10-2011-0112636

(51) Int. Cl.
*G08C 19/06* (2006.01)
*H04Q 9/00* (2006.01)

(52) U.S. Cl.
CPC ............ *H04Q 9/00* (2013.01); *H04Q 2209/10* (2013.01); *H04Q 2209/43* (2013.01); *H04Q 2209/60* (2013.01)

(58) Field of Classification Search
None
See application file for complete search history.

(56) References Cited

U.S. PATENT DOCUMENTS

| 6,073,169 | A * | 6/2000 | Shuey et al. ................... 709/217 |
| 2002/0159919 | A1* | 10/2002 | Churchill et al. ............ 422/100 |
| 2011/0002416 | A1* | 1/2011 | Shin et al. ..................... 375/308 |
| 2011/0299509 | A1* | 12/2011 | Wang et al. ................... 370/336 |
| 2011/0306375 | A1* | 12/2011 | Chandra et al. .............. 455/509 |
| 2012/0106614 | A1* | 5/2012 | Kim et al. ..................... 375/227 |
| 2012/0281637 | A1* | 11/2012 | Junell .................... H04W 16/14 370/329 |
| 2012/0314088 | A1* | 12/2012 | Li et al. ......................... 348/192 |
| 2012/0322479 | A1* | 12/2012 | Hakola et al. ................ 455/507 |
| 2013/0024556 | A1* | 1/2013 | Zhu ............................... 709/223 |
| 2013/0070605 | A1* | 3/2013 | Ghosh ................ H04W 72/082 370/241 |

FOREIGN PATENT DOCUMENTS

KR 10-2010-0122603 A 11/2010
KR 10-2011-0002776 A 1/2011
(Continued)

OTHER PUBLICATIONS

Communication from the Korean Patent Office issued Nov. 18, 2014 in a counterpart Korean Application No. 10-2011-0112636.
Fatemieh et al., "Low Cost and Secure Smart Meter Communications Using the TV White Spaces", Resilient Control Systems (ISRCS), 2010 3rd International Symposium, Aug. 10-12, 2010, pp. 37-42.

(Continued)

*Primary Examiner* — Ojiako Nwugo
(74) *Attorney, Agent, or Firm* — Sughrue Mion, PLLC

(57) ABSTRACT

A smart metering system using a white space band includes a band search sensor installed in a predefined area which scans a digital public broadcast channel band; a band management server which manages area specific broadcast channel status information based on a scanning result obtained by the band search sensor and which searches a white space band that is an idle channel band of a corresponding area based on the broadcast channel status information to allocate the white space band as a smart metering data transmission channel; and a base station which allocates the smart metering data transmission channel from the band management server and which forms a wireless communication channel between a smart meter and a grid central server via the allocated smart metering data transmission channel.

17 Claims, 8 Drawing Sheets

(56) References Cited

FOREIGN PATENT DOCUMENTS

| KR | 10-2011-0059618 A | 6/2011 |
| KR | 1020110077450 A | 7/2011 |
| KR | 1020110101997 A | 9/2011 |
| KR | 10-2011-0113842 A | 10/2011 |
| WO | 2010/021781 A1 | 2/2010 |

OTHER PUBLICATIONS

"TV White Space Used for Smart Grid Technologies", Thursday, Jun. 24, 2010; Smartmeters.com URL: http://www.smartmeters.com/the-news/1051-tv-white-space-used-for-smart-grid-technologies-.html.

* cited by examiner

SMART METERING SYSTEM USING WHITE SPACE BAND AND SMART METERING METHOD USING THE SAME

BACKGROUND

1. Field

Exemplary embodiments relate to a smart metering system using a white space band and a smart metering method using the same, and more particularly, to a smart metering system, which transmits power information data, such as metering data obtained by a smart meter, and a control signal by using a white space band that is an idle channel band in a channel band used by a digital television (DTV), and a smart metering method using the same.

2. Description of the Related Art

A concept of a smart grid is introduced in order to efficiently manage energy. The smart grid refers to an "intelligent power network" that optimizes energy efficiency by exchanging real time information between a power provider and a consumer bidirectionally by combining an information technology with a conventional unidirectional power network, which comprises steps of generation, transmission, distribution, and sale of electric energy. By connecting a power plant, a facility for transmitting and distributing power, and a consumer of power via an information communication network and allowing information to be shared bidirectionally, an entire system may be efficiently operated as one entity.

In the smart grid, in order to add an intelligence capability to a power infrastructure to more efficiently and effectively manage and control an entire process from production to consumption of electric power, applications of an information and communication technology are actively being developed. Particularly, because the power provider and the consumer are able to exchange real time power information bidirectionally by combining the information technology to a power grid, the smart grid receives much attention as a next generation power network that induces reasonable energy consumption through bi-directional power information exchange and optimizes energy efficiency while providing high quality energy and various additional services.

In this trend, advanced countries such as the United States and various countries in Europe have been developing various power network strategies based on information technology (IT) since early 2000, and Korea is also in a process of developing a national level policy and strategy related to the smart grid.

FIG. 1 illustrates a schematic configuration of a smart grid.

Referring to FIG. 1, with respect to the generation, storage, and management of electric power, a plugged-in electric vehicle, an intelligent consumer, and renewable energy, it is possible to produce and consume the electric power bidirectionally without having a boundary between generation and consumption of the electric power, thus avoiding a conventional one-way structure of generation, transmission, distribution, and consumption of the electric power. In order to transmit information relating to generation and consumption of the electric power, a field area network (FAN) and/or a wide area network (WAN) may be used to provide a communication means within a smart grid advanced metering infrastructure (AMI).

A communication infrastructure for interconnection between a power system and control systems that constitute the smart grid system may be used in conjunction with any one or more of various wired or wireless communication networks. When constructing the smart grid, a determination of which communication method is used to transmit smart metering data becomes a very important factor, and accordingly, such communication infrastructure will be described in detail.

A home area network (HAN), a building area network (BAN), and an industrial area network (IAN) are communication transmission networks in a respective area of home, buildings and industry in a smart consumer field, and a representative technology thereof includes, for example, a conventional power line communication (PLC), ZigBee in a wireless personal area network (WPAN), and Wi-Fi in a wireless local area network (WLAN).

A neighborhood area network (NAN) is a communication transmission network that handles a smart grid field area, and a representative technology thereof may include, for example, a conventional public mobile communication network such as WCDMA and WiBro, a wireless mesh network technology such as IEEE 802.11s WiFi mesh, IEEE 802.15.4 g smart utility network (SUN), the conventional power line communication (PLC), and ZigBee in the WPAN.

A wide area network (WAN) typically comprises a core/metro network and a backhaul network. The interconnection between relay systems may be enabled by using a wired network based on Ethernet, and the interconnection between a utility system and a management system may be enabled by WiBro and WCDMA that are wireless and mobile communication network technologies used in a NAN area.

As described above, in a conventional communication infrastructure used in conjunction with the smart grid, various communication methods, such as a power line communication (PLC) network, a mobile communication network, a public switched telephone network (PSTN), or an internet network may be used.

The communication network in an area of homes, buildings or industry typically does not have a wide network coverage, such that a probability of crosstalk or interference with other communication network is extremely low, thereby causing no problem; however, when using the same or similar communication method in a NAN or WAN area, crosstalk or interference with one or more other communication networks may occur. Particularly, in a case of transmitting the smart metering data in the NAN or WAN area, despite a characteristic that a size of data packet is not large and a transmission speed is not required to be high, in the above-described conventional technology, a communication line or a communication channel may be excessively applied to the smart metering data transmission while the communication line or communication channel is in heavy use due to distribution of various communication devices according to advancement of a communication technology. Further, the communication method which has a high charge due to its high utility value may be applied to the smart metering transmission, such that a corresponding cost for smart metering data transmission is increased and communication efficiency is lowered.

In addition, the smart metering data transmission which uses a wired communication network, such as the power line communication (PLC) or wired internet network, has a locational limitation when installing each device of the smart grid system, which also lowers efficiency.

SUMMARY

Accordingly, the exemplary embodiments have been made in view of the above problems, and the exemplary embodiments provide a smart metering system that is suitable for smart metering data transmission and a smart metering method using the same based on a characteristic of the smart metering data transmission that a data packet size is not large and a transmission speed is not required to be high.

Further, the exemplary embodiments may solve a problem relating to a cost of smart metering data transmission being increased while communication efficiency is lowered due to a communication line or communication channel, which is being heavily used due to distribution of various communication devices in accordance with advancement of a communication technology, being excessively applied to the smart metering data transmission, and the related problem of a communication method which has a relatively high cost being employed for the smart metering transmission.

Further, the exemplary embodiments are directed to solving a problem that a spatial limitation exists when installing each device of a smart grid system according to the communication method.

According to an aspect of the one or more exemplary embodiments, a smart metering system includes a band search sensor which is installed in a predefined area and which scans a digital public broadcast channel band; a band management server which manages area-specific broadcast channel status information based on a scanning result obtained by the band search sensor and which searches a white space band that is an idle channel band of a corresponding area based on the broadcast channel status information to allocate the white space band as a smart metering data transmission channel; and a base station which allocates the smart metering data transmission channel from the band management server and which forms a wireless communication channel between a smart meter and a grid central server via the allocated smart metering data transmission channel.

The band search sensor may include a spectrum sensor module which scans the digital public broadcast channel band; and a sensor communication module which transmits broadcast channel information obtained by the spectrum sensor module to the band management server, and the band management server may include a server communication module which provides a connection for wireless communication between the band search sensor and the base station; a broadcast channel management unit which generates and manages the area-specific broadcast channel status information based on the broadcast channel information received from the band search sensor; and a broadcast channel allocation unit which searches an available idle broadcast channel band of the corresponding area to be allocated as the smart metering data transmission channel.

Further, the base station may include a base station communication module which transmits a request for an allocation of the smart metering data transmission channel to the band management server and which sets the allocated smart metering data transmission channel as a communication channel; and a radio frequency (RF) relay module which associates the allocated smart metering data transmission channel with the smart meter and which forms the wireless communication channel between the smart meter and the grid central server.

The band search sensor may include a global positioning system (GPS) module which obtains location information relating to the band search sensor, wherein the sensor communication module may transmit the obtained location information together with the broadcast channel information to the band management server.

Still further, the smart meter applicable to the smart metering system according to the present exemplary embodiment may include a meter that measures power consumption and controls an electronic device, and the smart meter may include an RF communication module which transmits power consumption data and receives a control signal via the smart metering data transmission channel; and a channel change module which updates change information relating to the smart metering data transmission channel.

The base station may include the band search sensor, and the band search sensor may scan the digital public broadcast channel band within an RF communication coverage area of the base station.

According to another aspect of one or more exemplary embodiments, a method for performing smart metering includes managing a broadcast channel status in which an area-specific broadcast channel usage status is generated by a band management server based on broadcast channel information obtained by scanning a digital public broadcast channel band of a corresponding area in which a base station is located; allocating a broadcast channel by searching an idle broadcast channel band by the band management server based on the generated broadcast channel usage status and allocating the searched idle broadcast band to the base station as a smart metering data transmission channel; and forming a communication channel between a smart meter, which is located within an RF communication coverage area of the base station, and a grid central server via the allocated smart metering data transmission channel.

The step of managing the broadcast channel status may include scanning the broadcast channel in which the digital public broadcast channel band in the corresponding area is searched by a band search sensor; transmitting broadcast channel band information obtained from the scanning and location information relating to a scanned area to the band management server; and generating the broadcast channel status in which the broadcast channel band information is classified by the band management server according to an area in correspondence with the location information and the area-specific broadcast channel usage status and an idle channel status are generated to be included.

Further, the allocating the broadcast channel may include receiving a request for a broadcast channel allocation by the band management server from the base station; searching the idle channel band by the band management server based on the broadcast channel usage status based on the received request for the broadcast channel allocation; and responding to the request by providing a response in which the searched idle channel band is allocated to the base station as the smart metering data transmission channel.

In particular, the base station may receive the request for the broadcast channel allocation for use in conjunction with a smart metering data transmission from the smart meter; and the request for the broadcast channel allocation may include a request for a broadcast channel allocation to the smart meter.

Further, the forming the communication channel may include allocating, by the base station, the smart metering data transmission channel to the smart meter which requests allocation of the broadcast channel; forming, by the base station, the communication channel between the smart meter and the grid central server by using the smart metering data transmission channel; and relaying, by the base station, a power information data transmission between the smart meter and the grid central server via the smart metering data transmission channel.

The allocating the broadcast channel may include reflecting, by the band management server, the idle broadcast channel band to the broadcast channel usage status of a corresponding area.

Further, the managing the broadcast channel status may include managing an overlapping channel status by updating the area-specific broadcast channel usage status is updated by the band management server based on the broadcast channel band information, and by determining whether the digital public broadcast channel overlaps with the smart metering data transmission channel based on the updated area-specific broadcast channel usage status, and the allocating the broadcast channel may further include reallocating the idle broadcast channel band by the band management server to the base station in replacement of the smart metering data transmission channel when a determination that the smart metering data transmission channel overlaps with the digital public broadcast channel is made.

In particular, the managing the overlapping channel may further include renewing the broadcast channel status by updating the area-specific broadcast channel usage status by the band management server based on the broadcast channel band information after a periodic scan is performed by the band search sensor; and determining whether the digital public broadcast channel overlaps with the smart metering data transmission channel by the band management server based on the updated area specific broadcast channel usage status.

Further, the reallocating the channel may include searching, by the band management server, the idle broadcast channel band based on the broadcast channel usage status of an area of the overlapping smart metering data transmission channel that is allocated; and reallocating, by the band management server, the searched idle broadcast channel band to the base station that uses the overlapping smart metering data transmission channel in replacement of the smart metering data transmission channel.

Further, the forming the communication channel may include allocating, by the base station, the reallocated smart metering data transmission channel to the smart meter that uses the overlapping smart metering data transmission channel; connecting, by the smart meter, to the base station using the reallocated smart metering data transmission channel; and forming, by the base station, the communication channel between the smart meter and the grid central server by using the reallocated smart metering data transmission channel.

BRIEF DESCRIPTION OF THE DRAWINGS

The above and other objects, features and advantages of the exemplary embodiments will be more clearly understood from the following detailed description taken in conjunction with the accompanying drawings, in which.

DETAILED DESCRIPTION OF EXEMPLARY EMBODIMENTS

Figure 1:
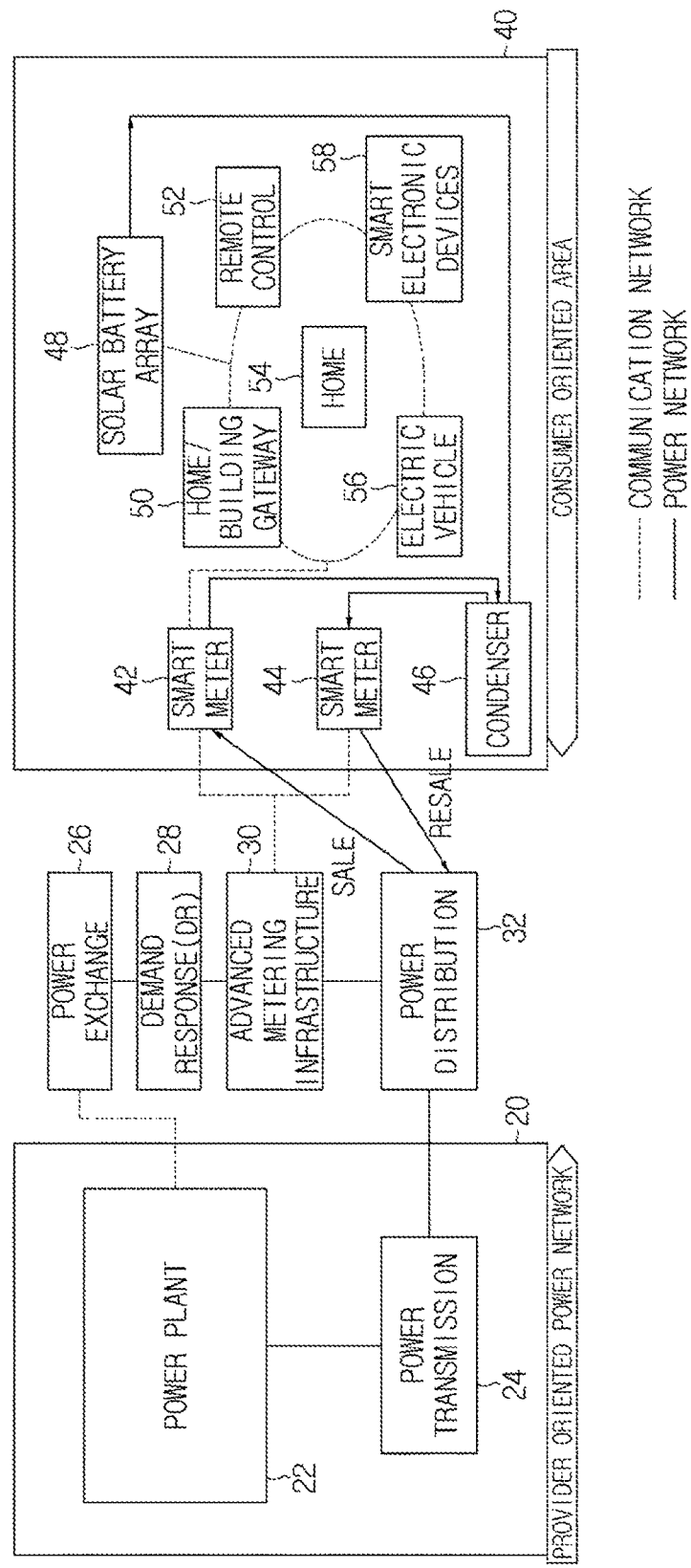
FIG. 1 is a block diagram illustrating a schematic configuration of a smart grid according to related art.

The present inventive concept, the operational advantage of the present inventive concept, and aspects that may be achieved by exemplary embodiments will be described with reference to exemplary embodiments set forth hereinafter.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, components and/or groups thereof, but do not preclude the presence or addition of one or more other features, integers, steps, operations, elements, components, and/or groups thereof.

Detailed descriptions of well-known functions and structures incorporated herein may be omitted to avoid obscuring the subject matter of the exemplary embodiments.

The exemplary embodiments are directed to a smart metering system capable of transmitting power information data, such as metering data obtained by a smart grid system, and a control signal of each device by replacing a communication method used for a neighborhood area network (NAN) or a wide area network (WAN) of a smart grid by employing a communication method which uses a white space band that is an idle channel band that exists in a digital public broadcast channel, and a smart metering method using the same.

In one or more of the exemplary embodiments, a television (TV) white space band, which is to be used as a power information data transmission channel of the smart grid system, indicates a frequency band that is empty and not used by a broadcast provider in VHF and UHF frequency bands that are allocated for a TV broadcast. The TV white space band is a non-licensed band that is available to the public provided that radio regulations are satisfied.

In particular, in a spatial sense, the TV white space band indicates a band that is empty due to potential frequency interference between broadcast providers, a frequency band that is not used in each area, or a frequency band within an area that is not reached by a broadcast radio. In a temporal sense, the TV white space band is a broadcast frequency band that is empty during a dawn time slot in which a broadcast is not transmitted by the broadcast provider.

In particular, because the TV white space band has a good frequency characteristic which is sufficient to provide a broader service coverage, as compared with a high frequency equal to or higher than 1 GHz, the TV white space band may provide a service for various purposes such as, for example, public security, area information providing service, or super Wi-Fi. Accordingly, in order to efficiently use a deficient frequency resource and provide various high quality services, technology standardization for the TV white space band is being prepared in developed countries such as the United States, the United Kingdom (UK), and the member countries of the European Union (EU). In the United States, which is in the top lead, the Federal Communications Commission (FCC) passed a resolution that allows unlicensed use of the TV white space band that is a non-used TV frequency band in November 2008. The TV white space band is one of the most preferred frequency bands in the field of wireless communication, and standardization for a new service using the white space is being prepared in IEEE 802.11, 802.15, 802.16 and 802.22. The United States authorized the use of unlicensed TV white space in 2008 and, after controversy with broadcast stations, amended the law to finally allow the broadcast stations to use the TV white space in 2010 and selected TV white space database operators. The U.K. and the EU are developing an institution such as technology standardization, and Japan is promoting a trial service to develop a legal system and a service model. In Korea, the TV white space is expected to be used in 2013 when an analog TV broadcast is shut down and a transition to a digital broadcast TV is completed.

Figure 2:
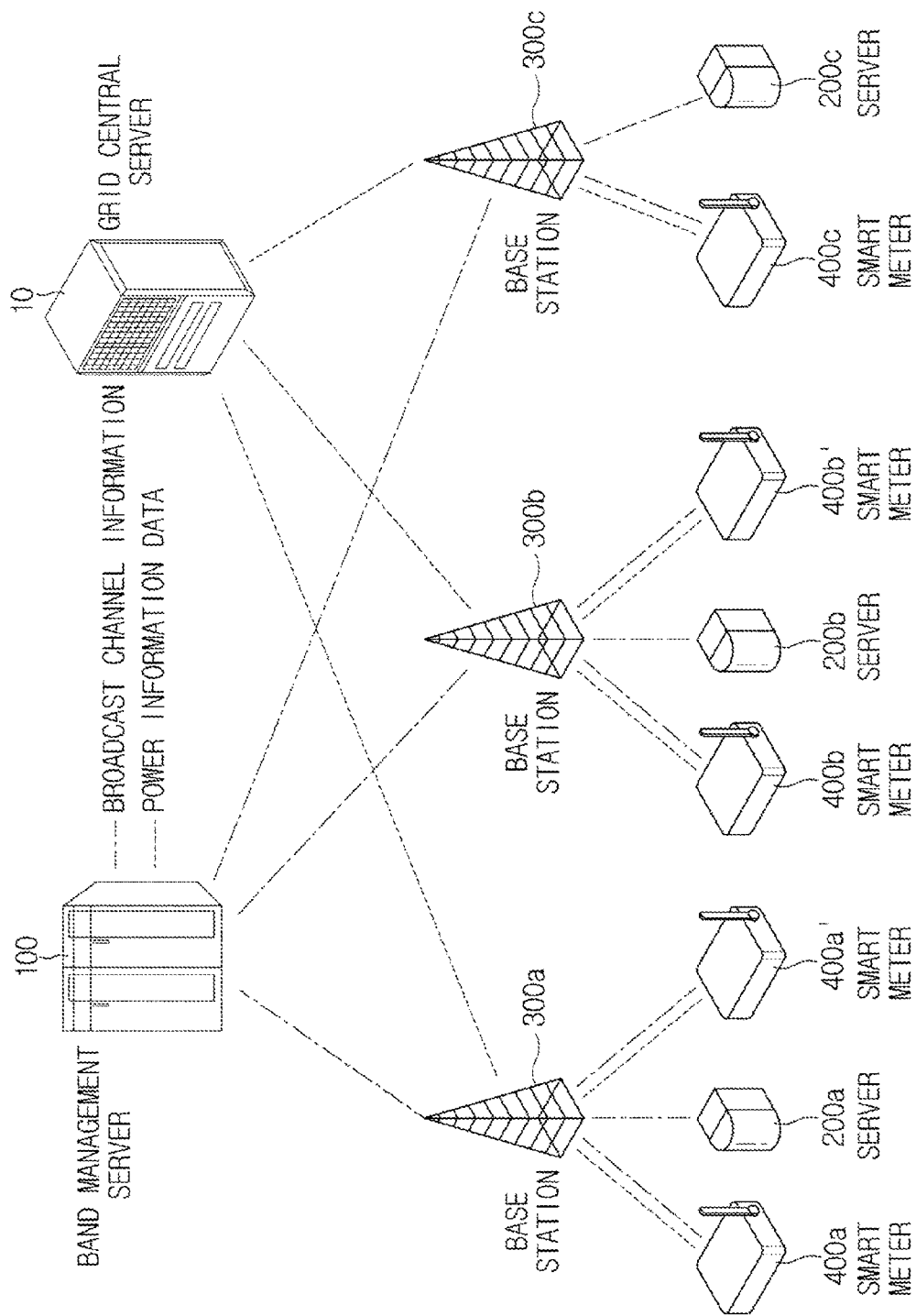
FIG. 2 is a view illustrating a schematic configuration of a smart metering system which uses a white space band according to an exemplary embodiment.

A first feature of an exemplary embodiment relates to a smart metering system using the white space band, in which the white space band is used as a smart metering data transmission channel. FIG. 2 is a schematic view illustrating a configuration of the smart metering system using the white space band according to an exemplary embodiment.

The smart metering system using the white space band according to an exemplary embodiment includes a band management server 100, band search sensors 200a, 200b, 200c and base stations 300a, 300b, 300c and smart meters 400a, 400a', 400b, 400b', 400c.

The band search sensors 200a, 200b, 200c are installed in each respective predefined area to scan a digital public broadcast channel band of a corresponding area and to transmit information relating to the searched digital public broadcast channel band that is being used to the band management server 100. In FIG. 2, it is shown that each band search sensor 200a, 200b, 200c transmits digital public broadcast channel band information which is obtained from a respective scan via the base station 300a, 300b, 300c of the corresponding area to the band management server 100. However, depending on a situation, each respective band search sensor 200a, 200b, 200c may be directly connected to the band management server 100 to transmit the corresponding digital public broadcast channel band information.

The band management server 100 collects digital public broadcast channel band information received from each respective area to manage an area-specific broadcast channel status and searches for the respective white space band that is an idle channel band in the corresponding area based on area-specific broadcast channel status information in order to allocate the respective white space band as the smart metering data transmission channel of the corresponding area.

In an exemplary embodiment, the band management server 100 includes devices, which include one or more managers and/or a controller. Each device, manager, and a controller may be software per se, a combination of software and hardware, or hardware. For example, a server may include a memory which stores the devices and a processor which executes these devices. By way of another example, each device may include a processor, a microprocessor, a field programmable gate array (FPGA), and/or an application specific integrated circuit (ASIC).

Although described as a server 100, one of ordinary skill in the art would readily appreciate that the server 100 may be implemented as a number of servers remotely connected via a network and may include one or more databases. One of ordinary skill in the art would readily appreciate that a description of a server 100 is provided by way of an example only and not by way of a limitation.

The base stations 300a, 300b, 300c relay a communication channel between the smart meters 400a, 400a', 400b, 400b', 400c and a grid central server 10 by using the allocated white space band as the smart metering data transmission channel.

In particular, the smart meters 400a, 400a', 400b, 400b', 400c refer to a device that is capable of measuring power consumption in a predetermined area or power consumption of a particular electronic device, and is also capable of controlling power usage in the predetermined area or the power usage of the particular electronic device.

Figure 3:
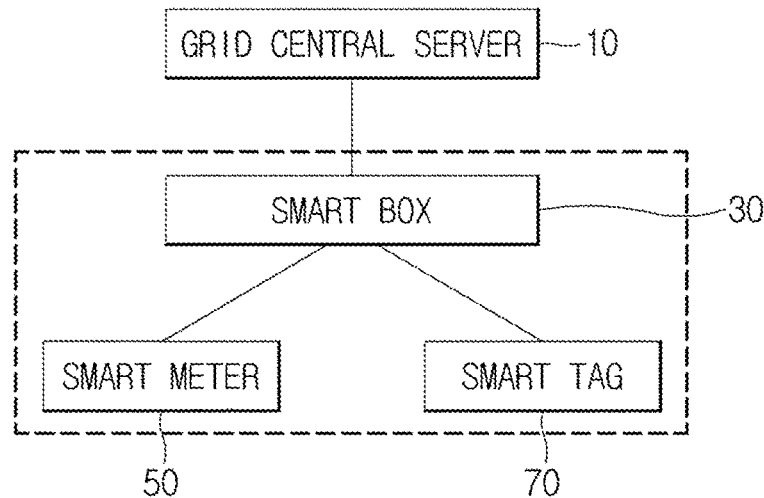
FIG. 3 is a view illustrating a configuration of a general smart metering system according to an exemplary embodiment.

FIG. 3 is a view illustrating a configuration of a general smart metering system according to an exemplary embodiment, in which a smart meter 50 or a smart tag 70 is generally connected to the grid central server 10 through a smart box 30.

In particular, the smart meter 50 refers to a device that is capable of measuring power consumption of a predetermined area, such as, for example, a home or a building, and is capable of globally controlling electronic devices within the predetermined area. The smart tag 70 refers to a device that is connected to, for example, an electricity supply outlet to individually measure power consumption of respective electronic devices and to control each respective electronic device. The smart box 30, which is a gateway for connecting the smart meter 50 and the smart tag 70 to the grid central server 10, may perform a function of a router.

In an exemplary embodiment, for illustrative purposes, the smart meters 400a, 400a', 400b, 400b', 400c may be used to collectively refer to one or more of the smart meter 50, the smart tag 70 or the smart box 30, depending on a situation. The smart meters 400a, 400a', 400b, 400b', 400c, shown in FIG. 2 are illustrated to have a one-to-one connection relationship with the base stations 300a, 300b, 300c; however, the present exemplary embodiment is not limited to this. The smart meter may be configured in a network architecture having various multi-layer structures such as, for example, a bus architecture, a star architecture, or a mesh architecture. Such network architecture having a multi-layer structure is not a subject matter of the present exemplary embodiment and thus is not shown in the drawings as well as a detailed description thereof is omitted.

Hereinafter, configurations of each device of the smart metering system will be described with reference to respective exemplary embodiments.

Figure 4A:
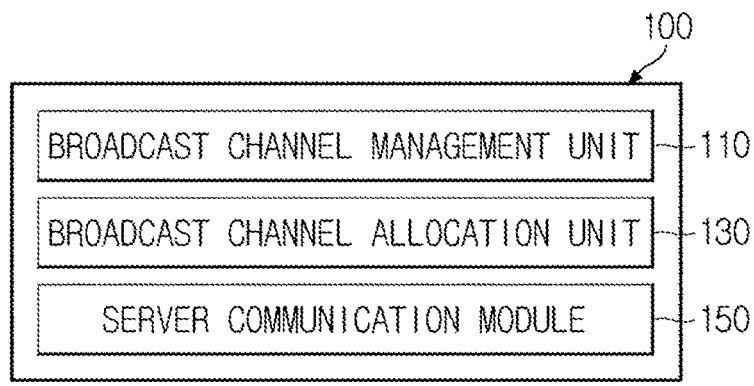
FIG. 4A is a view illustrating a configuration of a band management server in a smart metering system according to an exemplary embodiment.

FIG. 4A is a view illustrating a configuration of the band management server in a smart metering system according to an exemplary embodiment. The band management server 100 according to the present exemplary embodiment may approximately include a broadcast channel management unit 110, a broadcast channel allocation unit 130, and a server communication module 150.

The broadcast channel management unit 110 collects the respective digital public broadcast channel information from the band search sensor 200 of each corresponding area and manages the area-specific broadcast channel status information by classifying the collected digital public broadcast channel information per each corresponding area. Further, when the smart metering data transmission channel is allocated to a particular area, the broadcast channel management unit 110 reflects this allocation to the area-specific broadcast channel status information and updates the area-specific broadcast channel status information based on the digital public broadcast channel information that is collected periodically, or in real time to determine whether the digital public broadcast channel overlaps with the allocated smart metering data transmission channel.

The broadcast channel allocation unit 130 searches for an idle channel band that is a white space band of a corresponding area based on the area-specific broadcast channel status information of the broadcast channel management unit 110 and allocates the searched idle channel band as the smart metering data transmission channel of the corresponding area.

Further, when the smart metering data transmission channel, which is allocated to be used because of a non-use time slot of a broadcast channel band, overlaps with a digital public broadcast channel band, which is being used for transmissions due to arrival of a broadcast time, the broadcast channel allocation unit 130 searches for a new idle channel based on the area-specific broadcast channel status to change the smart metering data transmission channel that is overlapping with the digital public broadcast channel band, and reallocates the searched idle channel in replacement of the overlapping smart metering data transmission channel.

The server communication module 150 includes a communication interface for communication between the band search sensor 200 and the base station 300, and receives a scanning result of the digital public broadcast channel band from the band search sensor 200, and transmits a request for allocating a channel for transmitting the smart metering data from the base station 300 as well as smart metering data transmission channel information allocated to the base station 300.

In an exemplary embodiment, each of the broadcast channel management unit 110, the broadcast channel allocation unit 130, and the server communication module 150 includes devices, which include one or more managers and/or a controller. Each device, manager, and a controller may be software per se, a combination of software and hardware, or hardware. For example, a broadcast channel management unit 110, a broadcast channel allocation unit 130, and/or a server communication module 150 may include a memory which stores the devices and a processor which executes these devices. By way of another example, each device may include a processor, a microprocessor, a field programmable gate array (FPGA), and/or an application specific integrated circuit (ASIC).

Although described respectively as a broadcast channel management unit 110, a broadcast channel allocation unit 130, and a server communication module 150, one of ordinary skill in the art would readily appreciate that each of the broadcast channel management unit 110, the broadcast channel allocation unit 130, and the server communication module 150 may be implemented as a number of respective units and/or modules remotely connected via a network and may include one or more databases. One of ordinary skill in the art would readily appreciate that a description of each of a broadcast channel management unit 110, a broadcast channel allocation unit 130, and a server communication module 150 is provided by way of an example only and not by way of a limitation.

Figure 4B:
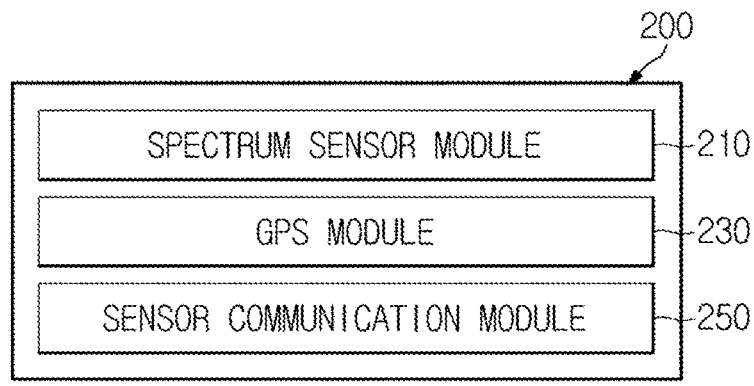
FIG. 4B is a view illustrating a configuration of a band search sensor in a smart metering system according to an exemplary embodiment.

FIG. 4B is a view illustrating a configuration of a band search sensor in a smart metering system according to an exemplary embodiment. The band search sensor 200 according to the present exemplary embodiment schematically includes a spectrum sensor module 210, a global positioning system (GPS) module 230, and a sensor communication module 250.

The spectrum sensor module 210 scans the digital public broadcast channel band of an area in which the band search sensor 200 is installed to search for the digital public broadcast channel band that is being used.

The GPS module 230 obtains information relating to a location in which the band search sensor 200 is installed. The location information relating to the band search sensor 200 and obtained via the GPS module 230 can be transmitted to the band management server 100 together with the digital public broadcast channel band information obtained as a result of scanning. Thus, by transmitting the digital public broadcast channel band information obtained as a result of scanning by the band search sensor 200 together with the GPS location information, the band management server 100 may classify any amount of digital public broadcast channel band information per each area, to generate the area-specific broadcast channel status.

However, the GPS module 230 is an optional element in configuring the band search sensor 200, and when the location information relating to the band search sensor 200 that is installed in each area is retained by the band management server 100, the GPS module 230 may not be separately needed.

The sensor communication module 250 includes a communication interface for communicating with the server communication module 150 of the band management server 100, and the digital public broadcast channel band information and the GPS location information are transmitted to the band management server 100 via the sensor communication module 250.

In an exemplary embodiment, each of the spectrum sensor module 210, the GPS module 230, and the sensor communication module 250 includes devices, which include one or more managers and/or a controller. Each device, manager, and a controller may be software per se, a combination of software and hardware, or hardware. For example, a spectrum sensor module 210, a GPS module 230, and/or a sensor communication module 250 may include a memory which stores the devices and a processor which executes these devices. By way of another example, each device may include a processor, a microprocessor, a field programmable gate array (FPGA), and/or an application specific integrated circuit (ASIC).

Although described respectively as a spectrum sensor module 210, a GPS module 230, and a sensor communication module 250, one of ordinary skill in the art would readily appreciate that each of the spectrum sensor module 210, the GPS module 230, and the sensor communication module 250 may be implemented as a number of respective units and/or modules remotely connected via a network and may include one or more databases. One of ordinary skill in the art would readily appreciate that a description of each of a spectrum sensor module 210, a GPS module 230, and a sensor communication module 250 is provided by way of an example only and not by way of a limitation.

Figure 5A:
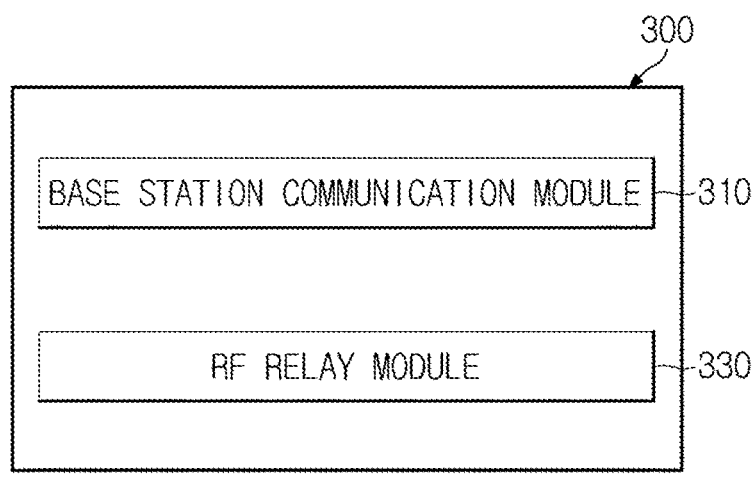
FIG. 5A is a view illustrating a configuration of a base station in a smart metering system according to an exemplary embodiment.

FIG. 5A is a view illustrating a configuration of a base station in a smart metering system according to an exemplary embodiment.

In the smart metering system according to the present exemplary embodiment, the base station 300 may schematically include a base station communication module 310 and an RF relay module 330.

The base station communication module 310 transmits, to the band management server 100, a request for allocating the smart metering data transmission channel, and includes a communication interface for setting the allocated smart metering data transmission channel as a communication channel, wherein the base station communication module 310 and the band management server 100 may be connected to each other by any one of various communication methods.

The RF relay module 330 allocates the smart metering data transmission channel to a smart meter 400 located within a respective RF communication coverage area of the base station 300, and relays transmission of the power information data by forming a wireless communication channel between the smart meter 400 and the grid central server 10 via the allocated smart metering data transmission channel.

In an exemplary embodiment, each of the base station communication module 310 and the RF relay module 330 includes devices, which include one or more managers and/or a controller. Each device, manager, and a controller may be software per se, a combination of software and hardware, or hardware. For example, each of a base station communication module 310 and a RF relay module 330 may include a memory which stores the devices and a processor which executes these devices. By way of another example, each device may include a processor, a microprocessor, a field programmable gate array (FPGA), and/or an application specific integrated circuit (ASIC).

Although described respectively as a base station communication module 310 and a RF relay module 330, one of ordinary skill in the art would readily appreciate that each of the base station communication module 310 and the RF relay module 330 may be implemented as a number of respective units and/or modules remotely connected via a network and may include one or more databases. One of ordinary skill in the art would readily appreciate that a description of each of a base station communication module 310 and a RF relay module 330 is provided by way of an example only and not by way of a limitation.

In the exemplary embodiment of the band search sensor 200 shown in FIG. 4B and the exemplary embodiment of the base station 300 shown in FIG. 5A, the band search sensor and the base station are illustrated as separate entities; however, depending on a situation, the band search sensor 200 may be included in the base station 300. In such a case where the band search sensor 200 is included in the base station 300, the band search sensor 300 may scan the digital public broadcast channel band within the RF communication coverage area to search the digital public communication channel band that is being used.

Figure 5B:
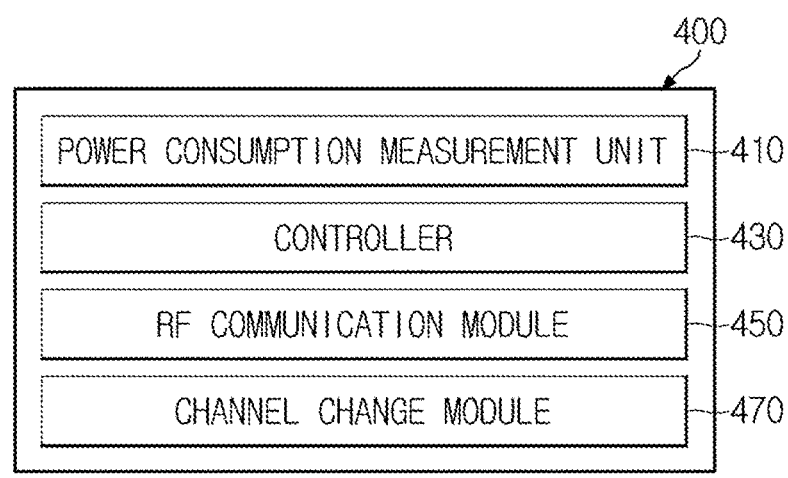
FIG. 5B is a view illustrating a configuration of a smart meter in a smart metering system according to an exemplary embodiment.

FIG. 5B is a view illustrating a configuration of a smart meter in a smart metering system according to an exemplary embodiment.

In the smart metering system according to the present exemplary embodiment, the smart meter 400 may include a power consumption measurement unit 410, a controller 430, an RF communication module 450, and a channel change module 470.

The power consumption measurement unit 410 measures power consumption in a predetermined area connected to the smart meter 400 or power consumption of respective electronic devices to obtain power consumption information. The controller 430 controls the predetermined area connected to the smart meter 400 or the electronic devices and provides various power information to a user. The power consumption measurement unit 410 and the controller 430 include various elements provided in a general smart meter.

Unlike the general smart meter, the smart meter 400 according to the present exemplary embodiment includes the RF communication module 450 and the channel change module 470, wherein the RF communication module 450 includes a communication interface for transmitting various power information data to the grid central server 10 or receiving various power information data from the grid central server 10 via the allocated smart metering data transmission channel.

In an exemplary embodiment, each of the power consumption measurement unit 410, the RF communication module 450, and the channel change module 470 includes devices, which include one or more managers and/or a controller. Each device, manager, and a controller may be software per se, a combination of software and hardware, or hardware. For example, each of a power consumption measurement unit 410, a RF communication module 450, and a channel change module 470 may include a memory which stores the devices and a processor which executes these devices. By way of another example, each device may include a processor, a microprocessor, a field programmable gate array (FPGA), and/or an application specific integrated circuit (ASIC).

Although respectively described as a power consumption measurement unit 410, a RF communication module 450, and a channel change module 470, one of ordinary skill in the art would readily appreciate that each of the power consumption measurement unit 410, the RF communication module 450, and the channel change module 470 may be implemented as a number of respective units and/or modules remotely connected via a network and may include one or more databases. One of ordinary skill in the art would readily appreciate that a description of each of a power consumption measurement unit 410, a RF communication module 450, and a channel change module 470 is provided by way of an example only and not by way of a limitation.

Further, when the smart metering data transmission channel, which is allocated to be used by the smart meter 400 because of a non-use time slot of a broadcast channel band, overlaps with the digital public broadcast channel band, which is being used for transmissions due to arrival of the broadcast time, in order to change the smart metering data transmission channel that is overlapping, the channel change module 470 updates change information relating to a smart metering data transmission channel that is reallocated by the band management server 100 and changes the smart metering data transmission channel that is being used to the reallocated smart metering data transmission channel.

As described above, by employing each element according to the present exemplary embodiment, the white space band may be used as the smart metering data transmission channel in the smart grid system.

Figure 6:
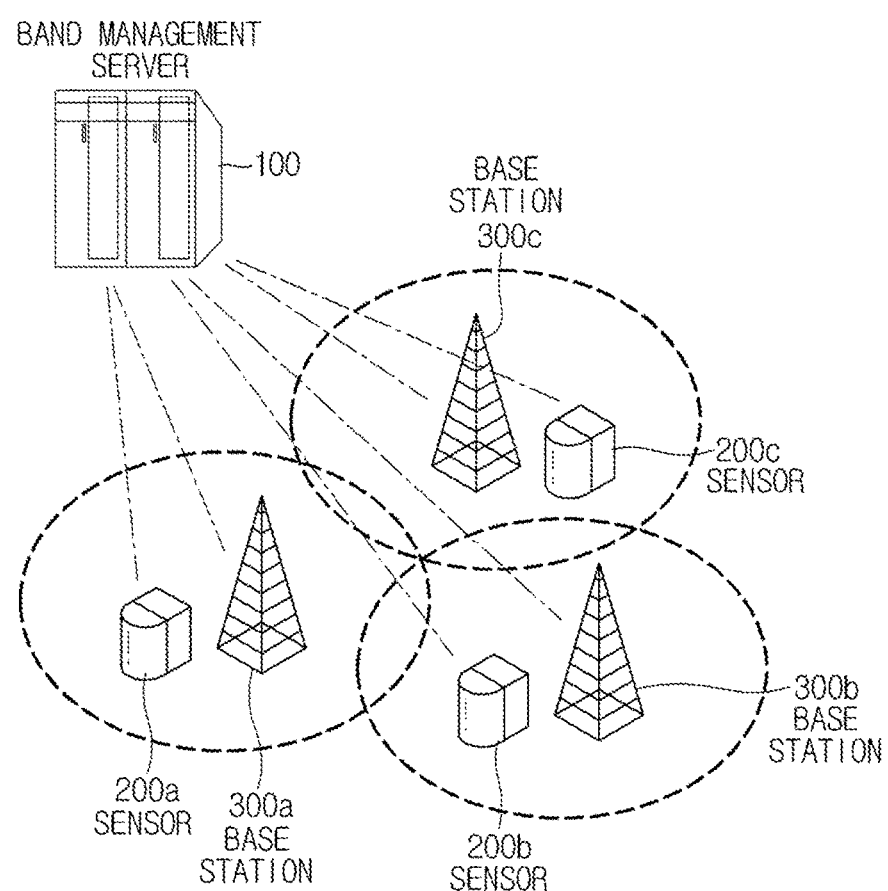
FIG. 6 is a schematic view illustrating a configuration of a system for allocating a broadcast channel of a white space band in conjunction with the operation of a smart metering system according to an exemplary embodiment.
Figure 7:
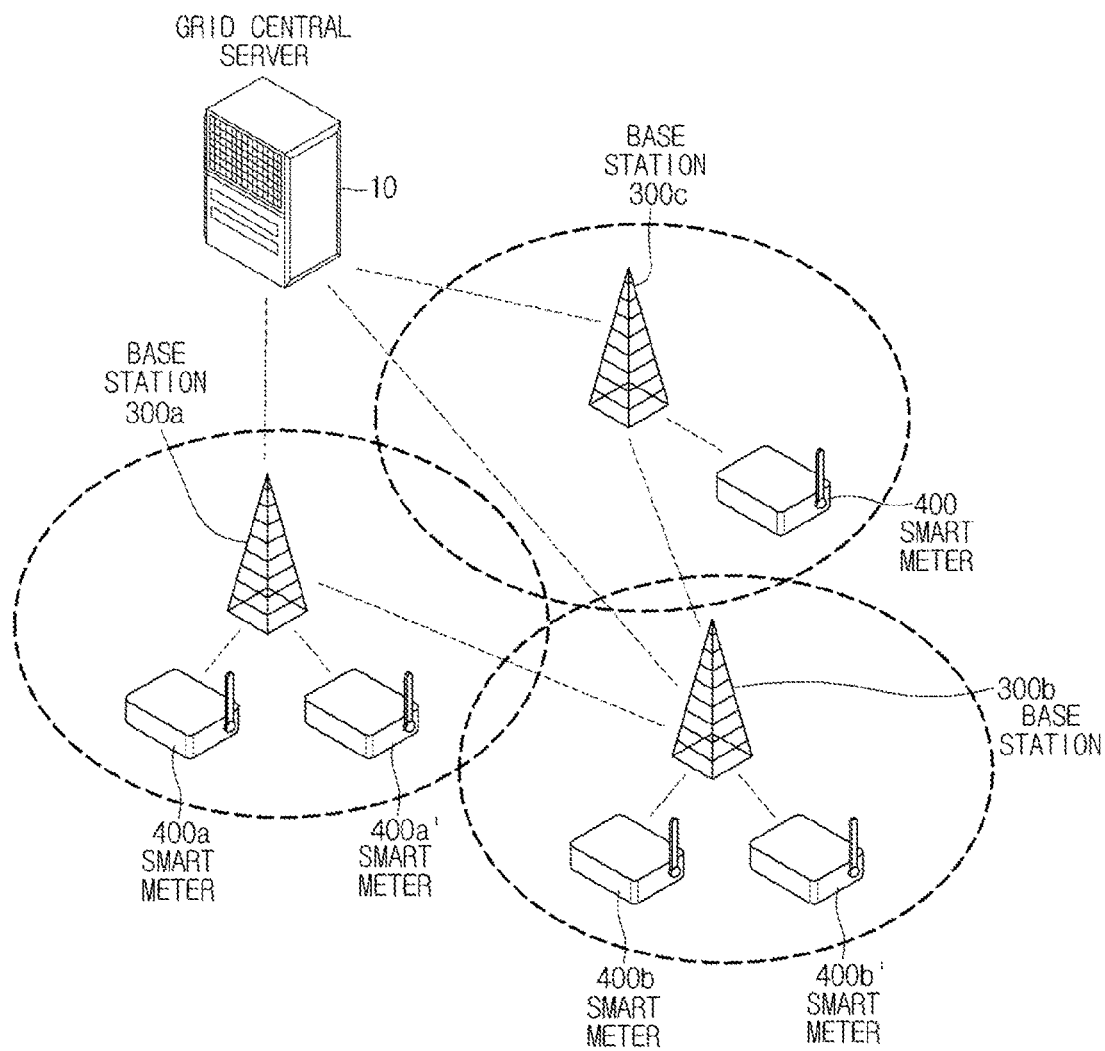
FIG. 7 is a schematic view illustrating a configuration of a system for using a white space band as a smart metering data transmission channel in conjunction with the operation of a smart metering system according to an exemplary embodiment.

In the smart metering system according to the present exemplary embodiment, an aspect of allocating the broadcast channel of the white space band and an aspect of using the white space band as the smart metering data transmission channel are separately discussed. FIG. 6 is a schematic view illustrating a configuration of a system for allocating a broadcast channel of a white space band in conjunction with the operation of a smart metering system according to an exemplary embodiment, and FIG. 7 is a schematic view illustrating a configuration of a system for using a white space band as a smart metering data transmission channel in conjunction with the operation of a smart metering system according to an exemplary embodiment.

First, an aspect of allocating the broadcast channel of the white space band in conjunction with the operation of the smart metering system according to an exemplary embodiment is described with reference to FIG. 6. As shown in the exemplary embodiment of FIG. 6, each respective one of the band search sensors 200*a*, 200*b*, 200*c* is installed in a corresponding predefined area to scan the digital public broadcast channel band of each corresponding area to search for the digital public broadcast channel that is being used.

As shown in the exemplary embodiment of FIG. 6, the respective base stations 300*a*, 300*b*, 300*c* may be installed to be separated from one another by a predetermined distance, considering the respective RF communication coverage areas, and the respective RF communication coverage area of each of the base stations 300*a*, 300*b*, 300*c* may be a corresponding area to which each respective one of the band search sensors 200*a*, 200*b*, 200*c* is predefined.

Each of the band search sensors 200*a*, 200*b*, 200*c* manages the corresponding area-specific broadcast channel status based on area-specific digital public broadcast channel information. When a request for allocating the smart metering data transmission channel to the smart meter 400 that is installed within the corresponding RF communication coverage area is received from the respective one of the base stations 300*a*, 300*b*, 300*c*, or when the allocated smart metering data transmission channel overlaps with the digital public broadcast channel, the corresponding one of the band search sensors 200*a*, 200*b*, 200*c* searches for an idle channel based on a broadcast channel status of an area in which a corresponding base station 300*a*, 300*b*, or 300*c* is located to allocate the white space band that is the idle channel to the corresponding base station 300*a*, 300*b*, or 300*c*.

An aspect of using the white space band as the smart metering data transmission channel in conjunction with the operation of the smart metering system according to an exemplary embodiment is described with reference to FIG. 7. Each respective base station 300*a*, 300*b*, or 300*c* allocates the smart metering data transmission channel with respect to the smart meter 400*a*, 400*a*', 400*b*, 400*b*', or 400*c* located within the corresponding RF communication coverage area thereof and relays a communication channel between the smart meter 400*a*, 400*a*', 400*b*, 400*b*', or 400*c* and the grid central server 10 by using the smart metering data transmission channel.

In particular, each respective base station 300*a*, 300*b*, 300*c* allocates the white space band, which is allocated to the corresponding area, as the smart metering data transmission channel for the smart meter 400*a*, 400*a*', 400*b*, 400*b*', or 400*c* located within the corresponding RF communication coverage area thereof, and each smart meter 400*a*, 400*a*', 400*b*, 400*b*', 400*c* is connected to the respective base station 300*a*, 300*b*, or 300*c* corresponding to the area to which the smart meter belongs and connected to the grid central server 10 through forming and relaying the communication channel of the base station 300*a*, 300*b*, or 300*c*.

In the smart metering system using the white space band according to the present exemplary embodiment, devices that are closely associated with each other to use the white space band as a channel for smart metering data transmission in each area are suggested, thereby increasing overall efficiency of the smart grid system while further increasing utilization of a communication frequency.

A second aspect of one or more exemplary embodiments relates to a smart metering method in which the white space band is used as the smart metering data transmission channel. In particular, the smart metering system using the white space band according to one or more exemplary embodiments may be used in the smart metering method, and therefore, description will be made with reference to exemplary embodiments of each device of the smart metering system shown in FIGS. 4 and 5.

When using the white space band, a spatial limitation should be considered. In particular, because the digital public broadcast channel band varies by area, the broadcast channel is changed based on the area, thereby changing the white space band. Therefore, a method of using the white space band that varies by area is needed. The following disclosure provides a description of a smart metering method using the white space band in consideration of a characteristic that the white space band varies in each area.

Figure 8:
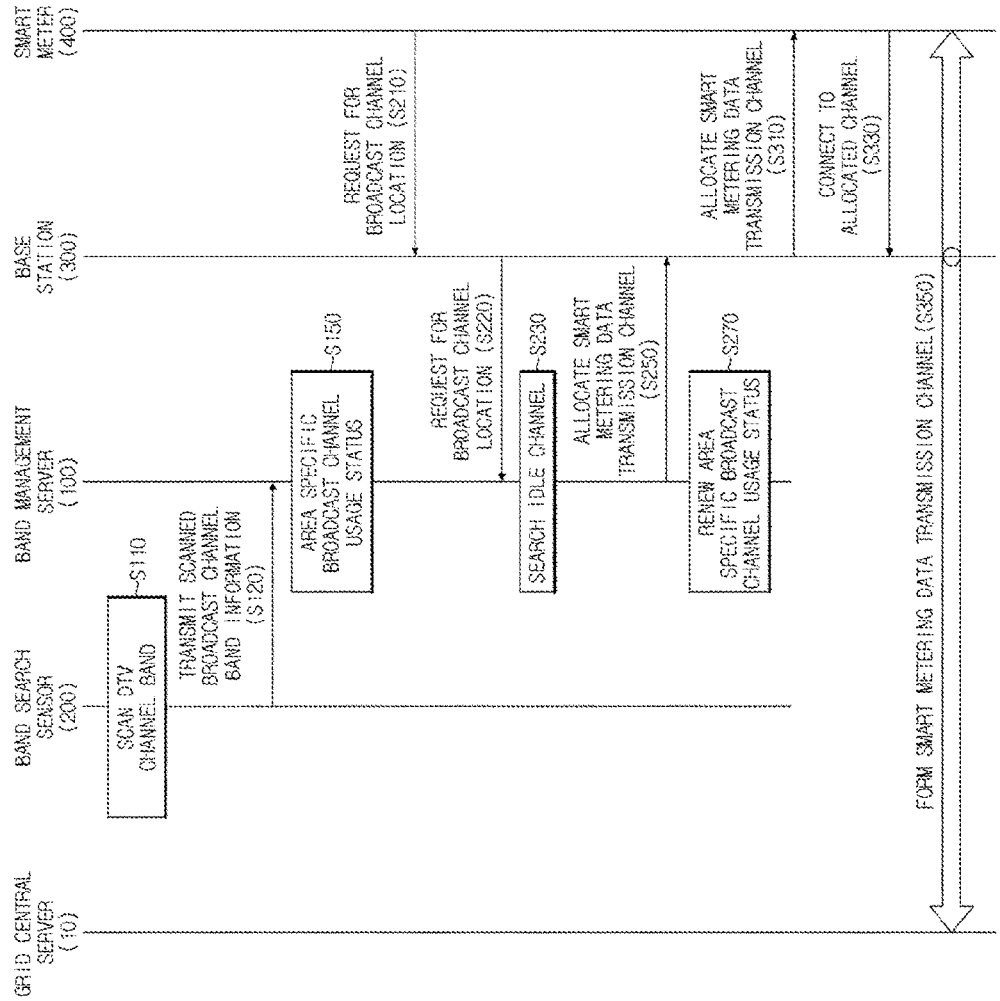
FIG. 8 is a flow chart illustrating a method of allocating a smart metering data transmission channel in conjunction with the operation of a smart metering system according to an exemplary embodiment.

FIG. 8 is a flow chart illustrating a method of allocating a smart metering data transmission channel in conjunction with the operation of a smart metering system according to an exemplary embodiment.

The respective band search sensor 200 installed in each corresponding area scans the digital public broadcast channel band of the corresponding area by using a spectrum sensor module 210 in operation S110, and transmits the obtained broadcast channel band information relating to the corresponding area to the band management server 100 in operation S120.

In operation S150, the broadcast channel management unit 110 of the band management server 100 collects information relating to a broadcast channel band transmitted to each corresponding area to generate an area-specific broadcast channel usage status to be managed. In particular, the white space band is the idle channel band that is a non-used broadcast channel band, and the white space band may be searched and retained by the broadcast channel management unit 110. Thus, the band management server 100 may manage, in advance, the area-specific broadcast channel usage status with respect to digital broadcast channel bands of many areas in addition to identifying the white space band that is the idle channel band.

Further, when the smart metering data transmission channel is required for power information data transmission, in operation S210, the smart meter 400 transmits a request for a broadcast channel allocation to the base station 300 having an RF communication coverage area in which the smart meter 400 is included, and in operation S220, a corresponding base station 300 transmits the same request to the band management server 100 according to the broadcast channel allocation request received from the smart meter 400.

In operation S230, after receiving the broadcast channel request for smart metering data transmission from the corresponding base station 300, the broadcast channel allocation unit 130 of the band management server 100 recognizes an area in which the corresponding base station 300 is located and searches for an idle channel based on the broadcast channel usage status of the area. In particular, as discussed above, the broadcast channel management unit 110 of the band management server 100 may identify, in advance, the status of the idle channel band of each area and, when information relating to the idle channel band is retained in advance, the broadcast channel allocation unit 130 of the band management server 100 may select one of these idle channel bands.

Further, in operation S250, the broadcast channel allocation unit 130 of the band management server 100 allocates the searched white space channel or selected idle channel to the corresponding base station 300 as the smart metering data transmission channel, and reflects the idle channel allocated as the smart metering data transmission channel as an update to the broadcast channel usage status of the corresponding area in operation S270.

In operation S310, the base station 300 allocates the smart metering data transmission channel allocated by the band management server 100 to the smart meter 400 that requests channel allocation, and the smart meter 400 to which the channel is allocated is connected to the base station 300 via the allocated smart metering data transmission channel in operation S330.

Next, in operation S350, the base station 300 recognizes a corresponding smart meter 400 to form a communication channel between the grid central server 10 and the smart meter 400 via the allocated smart metering data transmission channel, and relays the power information data transmission between the smart meter 400 and the grid central server 10.

In the above-described smart metering method according to an exemplary embodiment, the white space band is divided according to the area to allocate the smart metering data transmission channel for power information data transmission between the grid central server and the smart meter, thereby further increasing efficiency in using the white space band.

Further, when using the white space band, a temporal limitation should be considered. In particular, when a broadcast is not continuously transmitted but a frequency is transmitted during a predetermined time slot or random time slot in the digital public broadcast channel band, the white space band should not interfere or overlap with a transmitted signal.

The following disclosure provides a description of a smart metering method using the white space band in which a limitation to a use time of the white space band is considered.

Figure 9:
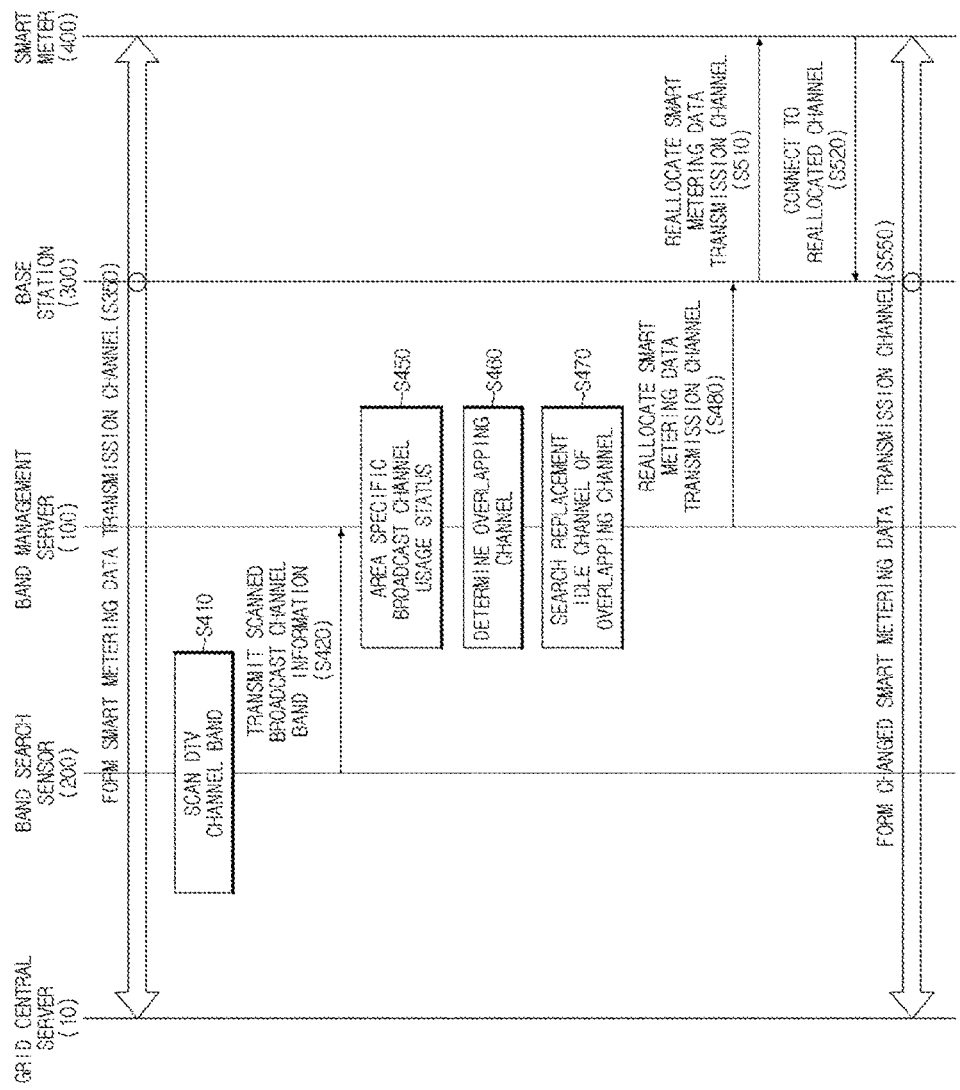
FIG. 9 is a flow chart illustrating a method of modifying a smart metering data transmission channel in conjunction with the operation of a smart metering system according to an exemplary embodiment.

FIG. 9 is a flow chart illustrating a method of modifying a smart metering data transmission channel in conjunction with the operation of a smart metering system according to an exemplary embodiment.

In operation S350, when the smart metering data transmission channel is formed between the grid central server 10 and the smart meter 400 of a particular area via the white space band, the band search sensor 200 located in the particular area scans the digital public broadcast channel band during a predefined period or randomly in operation S410, and then, in operation S420, the band search sensor 200 transmits the broadcast channel band information obtained as a result of the scan to the band management server 100. In operation S450, the broadcast channel management unit 110 of the band management server 100 collects the area-specific broadcast channel band information that is transmitted during a predefined period or randomly from each area to update the area-specific broadcast channel usage status, and then, in operation S460, determines whether an overlapping channel exists between the allocated smart metering data transmission channel and the digital public broadcast channel based on the updated broadcast channel usage status.

In operation S470, if an update result of the area-specific broadcast channel usage status indicates that the smart metering data transmission channel that has already been allocated to a particular area overlaps with the digital public broadcast channel due to a digital broadcast that is newly transmitted to the particular area, the broadcast channel allocation unit 130 of the band management server 100 determines an area of the smart metering data transmission channel, which is the overlapping channel, to newly search for the white space band that is the idle channel to replace the smart metering data transmission channel that is the overlapping channel, based on the broadcast channel usage status of the particular area.

Further, in operation S480, the searched white space band that is the idle channel is reallocated to the base station 300 of the particular area such that the smart metering data transmission channel is changed to the white space band, and in operation S510, the base station 300 of the particular area reallocates the smart metering data transmission channel to the smart meter 400 that uses the smart metering data transmission channel that is the overlapping channel.

In operation S520, the channel change module 470 of the smart meter 400 recognizes the reallocated smart metering data transmission channel to update the change information of the smart metering data transmission channel and requests an access to the base station 300 via the changed reallocated smart metering data transmission channel.

Next, in operation S550, the base station 300 recognizes the smart meter 400 that is connected through the reallocated smart metering data transmission channel, and changes the smart metering data transmission channel formed between the grid central server 10 and the smart meter 400 such that a communication channel is formed between the grid central server 10 and the smart meter 400 via the reallocated smart metering data transmission channel, and relays the power information data transmission.

In the smart metering method using the white space band according to the above-described exemplary embodiments, a problem that the smart metering data transmission channel that is allocated in a non-use time slot of the white space band may overlap with the digital public broadcast channel band that is being used for transmission due to the arrival of the broadcast time may be solved. Therefore, the white space band may be used without a temporal limitation, thereby further increasing efficiency in using the white space band.

As described above, according to the smart metering system and the smart metering method in accordance with exemplary embodiments, a problem of high cost due to the use of expensive high quality communication lines or channels and a problem of degraded communication efficiency may be solved.

Further, the foregoing disclosure suggests a smart metering system using the white space band and a smart metering method using the same, in which, when using the white space band of the digital public broadcast channel as the smart metering data transmission channel, the white space band is selected spatially and temporarily to be used as the smart metering data transmission channel. In addition, a solution to a problem relating to the use of an overlapping channel between the smart metering data transmission channel and the transmitted digital public broadcast may be provided.

In the above, although the exemplary embodiments have been described with reference to the accompanying drawings, a person skilled in the art should apprehend that the present inventive concept can be embodied in other specific forms without departing from the technical spirit or essential characteristics thereof, which is defined by the appended claims and their equivalents. Thus, the exemplary embodiments described above should be construed as exemplary in every aspect and not limiting. Those skilled in the art can implement various changes and modifications from the above description of exemplary embodiments. Moreover, various modifications to these exemplary embodiments will be readily apparent to those skilled in the art, and the generic principles and specific examples defined herein may be applied to other exemplary embodiments.

What is claimed is:

1. A smart metering system, comprising:
a band search sensor which is installed in a predefined area and configured to scan a digital public broadcast channel band;
a band management server configured to manage area-specific broadcast channel status information based on a scanning result obtained by the band search sensor and to search a white space band that is an idle channel band of a corresponding area based on the broadcast channel status information to allocate the white space band as a smart metering data transmission channel; and
a base station configured to allocate the smart metering data transmission channel from the band management server and to form a wireless communication channel between a smart meter and a grid central server via the allocated smart metering data transmission channel,
wherein the idle channel band is a band that is not allocated to a broadcast provider in the corresponding area,
wherein the band management server is further configured to determine whether the digital public broadcast channel overlaps with the allocated smart metering data transmission channel, and
wherein the base station is further configured to reallocate the smart metering data transmission channel when the allocated smart metering data transmission channel is determined as overlapping with the digital public broadcast channel.

2. The smart metering system according to claim 1, wherein the band search sensor comprises:
a spectrum sensor module which scans the digital public broadcast channel band; and
a sensor communication module which transmits broadcast channel information obtained by the spectrum sensor module to the band management server, and
wherein the band management server comprises:
a server communication module which provides a connection for wireless communication between the band search sensor and the base station;
a broadcast channel management unit which generates and manages the area-specific broadcast channel status information based on the broadcast channel information received from the band search sensor; and
a broadcast channel allocation unit which searches an available idle channel band of the corresponding area to be allocated as the smart metering data transmission channel.

3. The smart metering system according to claim 1, wherein the base station comprises:
a base station communication module which transmits a request for an allocation of the smart metering data transmission channel to the band management server and which sets the allocated smart metering data transmission channel as a communication channel; and
a radio frequency (RF) relay module which associates the allocated smart metering data transmission channel with the smart meter and which forms the wireless communication channel between the smart meter and the grid central server.

4. The smart metering system according to claim 2, wherein the band search sensor further comprises:
a global positioning system (GPS) module which obtains location information relating to the band search sensor, wherein the sensor communication module is configured to transmit the obtained location information together with the broadcast channel information to the band management server.

5. The smart metering system according to claim 1, further comprising:
the smart meter which measures power consumption and which controls an electronic device, the smart meter comprising:
an RF communication module which transmits power consumption data and receives a control signal via the smart metering data transmission channel; and
a channel change module which updates change information relating to the smart metering data transmission channel.

6. The smart metering system according to claim 1, wherein the base station includes the band search sensor, and the band search sensor is configured to scan the digital public broadcast channel band within an RF communication coverage area of the base station.

7. A method of performing smart metering, comprising:
managing a broadcast channel status in which an area-specific broadcast channel usage status is generated by a band management server based on broadcast channel information obtained by scanning a digital public broadcast channel band of a corresponding area in which a base station is located;
allocating a broadcast channel by searching an idle broadcast channel band by the band management server based on the generated broadcast channel usage status and allocating the searched idle broadcast band to the base station as a smart metering data transmission channel;
forming a communication channel between a smart meter, which is located within an RF communication coverage area of the base station, and a grid central server via the allocated smart metering data transmission channel;
determining whether the digital public broadcast channel overlaps with the allocated smart metering channel; and
when a determination is made that the digital public broadcast channel overlaps with the allocated smart metering channel, reallocating the smart metering data transmission channel,
wherein the idle channel band is a band that is not allocated to a broadcast provider in the corresponding area.

8. The smart metering method according to claim 7, wherein the managing the broadcast channel status comprises:
scanning the broadcast channel in which the digital public broadcast channel band in the corresponding area is searched by a band search sensor;
transmitting broadcast channel band information obtained from the scanning and location information relating to a scanned area to the band management server; and
generating the broadcast channel status in which the broadcast channel band information is classified by the band management server according to an area in correspondence with the location information and the area-specific broadcast channel usage status and an idle channel status are generated to be included.

9. The smart metering method according to claim 7, wherein the allocating the broadcast channel comprises:
receiving a request for a broadcast channel allocation by the band management server from the base station;
searching the idle channel band by the band management server based on the broadcast channel usage status based on the received request for the broadcast channel allocation; and
responding to the request by providing a response in which the searched idle channel band is allocated to the base station as the smart metering data transmission channel.

10. The smart metering method according to claim 9, wherein the base station receives the request for the broadcast channel allocation for use in conjunction with a smart metering data transmission from the smart meter; and
wherein the request for the broadcast channel allocation comprises a request for a broadcast channel allocation to the smart meter.

11. The smart metering method according to claim 7, wherein the forming the communication channel comprises:
allocating, by the base station, the smart metering data transmission channel to the smart meter which requests allocation of the broadcast channel;
forming, by the base station, the communication channel between the smart meter and the grid central server by using the smart metering data transmission channel; and
relaying, by the base station, a power information data transmission between the smart meter and the grid central server via the smart metering data transmission channel.

12. The smart metering method according to claim 7, wherein the allocating the broadcast channel comprises:
reflecting, by the band management server, the idle channel band to the broadcast channel usage status of a corresponding area.

13. The smart metering method according to claim 12, wherein the managing the broadcast channel status comprises:
managing an overlapping channel status by updating the area-specific broadcast channel usage status by the band management server based on the broadcast channel band information, and by determining whether the digital public broadcast channel overlaps with the smart metering data transmission channel based on the updated area-specific broadcast channel usage status.

14. The smart metering method according to claim 13, wherein the managing the overlapping channel comprises:
renewing the broadcast channel status by updating the area-specific broadcast channel usage status by the band management server based on the broadcast channel band information after a periodic scan is performed by the band search sensor; and
determining whether the digital public broadcast channel overlaps with the smart metering data transmission channel by the band management server based on the updated area specific broadcast channel usage status.

15. The smart metering method according to claim 13, wherein the reallocating the channel comprises:
searching, by the band management server, the idle broadcast channel band based on the broadcast channel usage status of an area of the overlapping smart metering data transmission channel that is allocated; and
reallocating, by the band management server, the searched idle channel band to the base station that uses the overlapping smart metering data transmission channel in replacement of the smart metering data transmission channel.

16. The smart metering method according to claim 13, wherein the forming the communication channel comprises:
allocating, by the base station, the reallocated smart metering data transmission channel to the smart meter that uses the overlapping smart metering data transmission channel;
connecting, by the smart meter, to the base station using the reallocated smart metering data transmission channel; and
forming, by the base station, the communication channel between the smart meter and the grid central server by using the reallocated smart metering data transmission channel.

17. A smart metering system, comprising:
a band management server configured to manage area-specific broadcast channel status information based on a scanning result of a scan of a digital public broadcast channel band within a predefined area which is obtained by a band search sensor, and to search a white space band that is an idle channel band of a corresponding area based on the broadcast channel status information to allocate the white space band as a smart metering data transmission channel; and
a base station configured to allocate the smart metering data transmission channel from the band management server and to form a wireless communication channel between a smart meter and a grid central server via the allocated smart metering data transmission channel,
wherein the idle channel band is a band that is not allocated to a broadcast provider in the corresponding area;
wherein the band management server is further configured to determine whether the digital public broadcast channel overlaps with the allocated smart metering data transmission channel, and
wherein the base station is further configured to reallocate the smart metering data transmission channel when the allocated smart metering data transmission channel is determined as overlapping with the digital public broadcast channel.

* * * * *